United States Patent [19]

Pavlidis et al.

[11] Patent Number: 5,285,504
[45] Date of Patent: Feb. 8, 1994

[54] PAGE SEGMENTATION WITH TILT COMPENSATION

[75] Inventors: Theodosios Pavlidis, Setauket; Jiangying Zhou, Stonybrook, both of N.Y.

[73] Assignee: Research Foundation of the State University of New York, Albany, N.Y.

[21] Appl. No.: 767,029

[22] Filed: Sep. 27, 1991

[51] Int. Cl.$^5$ .................................................. G06K 9/34
[52] U.S. Cl. ........................................... 382/9; 382/46; 358/462
[58] Field of Search .......................... 382/9, 46, 48, 18; 358/462, 488

[56] References Cited

U.S. PATENT DOCUMENTS

| | | | |
|---|---|---|---|
| 4,503,556 | 3/1985 | Scherl et al. | 382/9 |
| 4,558,461 | 12/1985 | Schlang | 382/9 |
| 4,953,230 | 8/1990 | Kurose | 382/46 |
| 5,001,766 | 3/1991 | Baird | 382/46 |
| 5,172,422 | 12/1992 | Tan | 382/9 |

OTHER PUBLICATIONS

Henry S. Baird, Susan E. Jones and Steven J. Fortune, "Image Segmentation by Shape-Directed Covers", Proceedings 10th ICPR (Atlantic City, Jun. 1990), pp. 820–825.

Friedrich M. Wahl, Kwan Y. Wong, and Richard G. Casey, "Block Segmentation and Text Extraction in Mixed Text/Image Documents", vol. 20 Computer Graphics and Image Processing, pp. 375 to 390 (1982).

W. Scherl, F. Wasl and H. Fuchsberger, "Automatic Separation of Text, Graphic and Picture Segments in Printed Material", Pattern Recognition and Practice, pp. 212–221 (1980).

Emily G. Johnston "Printed Text Discrimination", Computer Graphics and Image Processing, vol. 3 (1974 pp. 83–89).

*Primary Examiner*—Leo H. Boudreau
*Assistant Examiner*—Larry J. Prikockis
*Attorney, Agent, or Firm*—Morgan & Finnegan

[57] ABSTRACT

A method and an apparatus which scans and recognizes a page having columns of text or pictorial images. The scanned page is partitioned into blocks of scanlines and the column gap between the columns are identified by a projection profile process. With this technique the page can be severely tilted while under scan and still be properly recognized.

7 Claims, 6 Drawing Sheets

PAGE SEGMENTATION WITH TILT COMPENSATION

TECHNICAL FIELD

The present invention relates to a system and a method for recognizing a scanned page having more than one column of text and/or pictorial images and for compensating any tilt or skew in the scanned page.

BACKGROUND OF THE INVENTION

It is known in the art to optically scan and recognize a page having text or pictorial images. The information from the scanned page is converted into electronic data as an array of pixels representing black or white points of each scanline in the paper. The data is stored and is aggregated to reproduce the scanned images. A problem with this technique is its inability to distinguish two or more columns in a page, i.e., the recognized lines will be interpreted as continuous and without the separation between the columns. If the document contains illustrations or graphics, interpretation will be erroneous if they are treated as text characters. Therefore, it is desirable to have a processing step to divide the scanned images into (1) areas corresponding to illustrations and (2) areas corresponding to text and to further subdivide the latter into columns. Then the recognition process will be applied to each column of text.

The process of partitioning images into columns of text is called page segmentation. One known page segmentation technique assumes that columns of text and illustrations form a right rectangle having one pair of sides vertical and the other horizontal. See, for example, U.S. Pat. No. 4,503,556 to Scherl, et al. and an article by H.S. Baird, S.E. Jones and S.J. Fortune "Image Segmentation by Shape-Directed Covers", published in the *Proceedings 10th Int. Conf. on Pattern Recognition* pp. 820–825, (June, 1990). The disclosure of each of these references is incorporated herein by reference for the purpose of providing an understanding of basic techniques employed in the general field of the invention.

In a commonly known technique in the art, the electronically scanned page is usually a matrix of 1's representing dark pixels and 0's representing light pixels. Generally, W is the width, H is the height of the matrix and m[i][j] represents the matrix element in the $i^{th}$ row and $j^{th}$ column. A projection profile along the horizontal is defined as $$P_h[i] = \sum_{j=0}^{j=W-1} m[i][j]$$

and a projection profile along the vertical is defined as $$P_v[j] = \sum_{i=0}^{i=H-1} m[i][j]$$

Previous state of the art methodologies assume that gaps between blocks of texts can be found by searching for places with projections of zero. If the page is upright, then indeed there will be a count of zero within the white spaces between columns along the page P[j]. When the page is tilted, then there will be a certain nonzero count in the white spaces between the columns.

Thus, prior art techniques often fail when the page is tilted while being scanned or when the document contains text and illustrations not printed in a rectangular form.

For example, consider a hypothetical situation where the text area of a page is 6 inches in width and 7 inches in height. When scanned at 300 pixels per inch, a matrix results with W equal to 1800 pixels and H equal to 2100 pixels. Suppose also that each of the two text columns is 2.85 inches wide (855 pixels) and the gap in between them is 0.3 inches (90 pixels). for values of j between approximately 860 and 940. However, if the page is scanned with a tilt of 6 degrees, then the white spaces will shift from the range of 860 to 940 at the top row to the range from 1080 to 1160 towards the bottom row.

Since the sine of 6 degrees equals about 0.105, each vertical projection with a "j" value greater than 940 will have a zero count for a length of approximately 0.3 inches divided by 0.105 or about 860 pixels. If the remaining 1240 pixels are mostly black, a count value as high as 1000 may not be unexpected.

In the example above, the vertical projection profile will be nonzero for "j" values between 860 and 940 if the tilt angle is greater than 2.5 degrees (tangent of 0.3 inches/7.0 inches).

Thus, it is desirable to improve the processing of scanning systems with techniques which are more tilt independent.

SUMMARY OF THE INVENTION

It is therefore an object of the invention to provide a system and a method for scanning and recognizing a document page and properly segmenting the columns even when the page is skewed or tilted while being scanned.

In accordance with the technique of the present invention, a document page is scanned. A search may be made for white spaces which are wide enough to be distinguished from other spacing, such as the white spacing between characters or words. However, such a method will produce erroneous results when very wide white spaces occur between two descendants or ascendants of characters, either within a column or across columns. In the former case they produce false starts, in the latter they distort the width of the column gap.

To overcome this problem, the page is partitioned into blocks of scanlines. The column gaps in each block are identified by a projection profile process. Blocks having matching column gaps are merged. The skew angle of each block is estimated by measuring the slope of the line dividing the center of the column gaps in the merged blocks. The scanned images are reconstructed by repositioning the merged blocks by matching column widths and column gap widths. Then the reconstructed image is rotated by the estimated skew angle to compensate for the tilt.

In contrast to previous techniques, the present invention performs projection profile on sections much smaller than a full page. Advantages derivable from this technique include a much more skew tolerant recognition process. For example, if the projections are computed only over a short height (less than 0.5 inches) of the text, the white spacings in a column gap of 0.3 inches can be detected even when the tilt is at an angle of about 31 degrees (tangent of 0.3/0.5). This is a dramatic improvement as compared to the 2.5 degrees of tilt found to be the maximum acceptable for a vertical projection over a height of 7 inches as explained in the background of the invention.

DESCRIPTION OF THE PREFERRED EMBODIMENT

Figure 1:
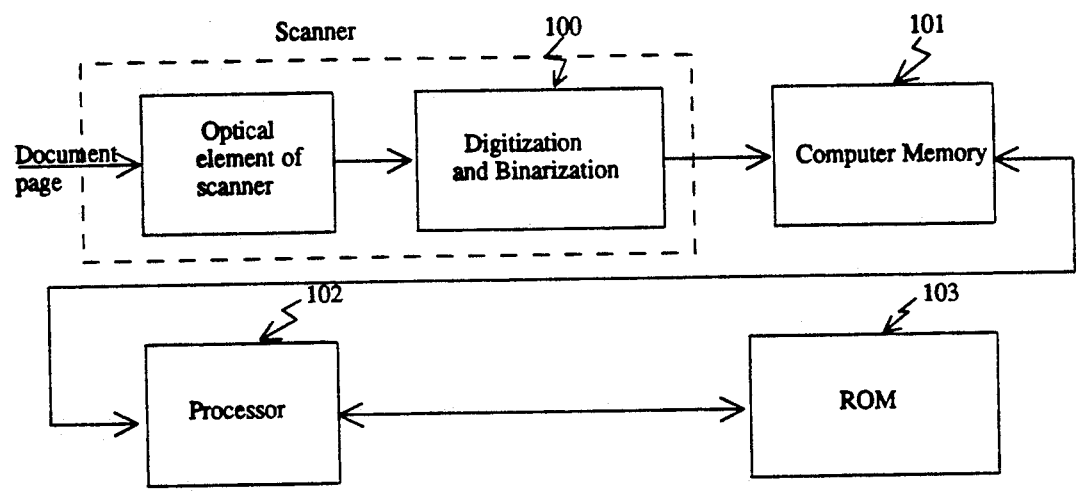
FIG. 1 illustrates a block diagram of the system according to the present invention.

FIG. 1 is a block diagram representation of a system according to a preferred embodiment of the present invention. A scanner 100 is used to obtain a binary representation of the images on a page. The binary information is stored in memory 101 and is preprocessed into run length format prior to processing by processor 102. The stored programs which embody the processing technique of the present invention can be loaded into memory 101. Alternatively, the programs can be permanently stored in a ROM 103. According to one preferred embodiment, a Ricoh 100 scanner with a resolution of 300 points per inch, which produces a binary image of 2512×3400 and a SUN 4 workstation are used. The UNIX operating system and the C programming language are used.

Illustrative commented software (source code) for carrying out the processes herein described forms a part of this specification and is attached hereto as Appendix A.

Figure 2:
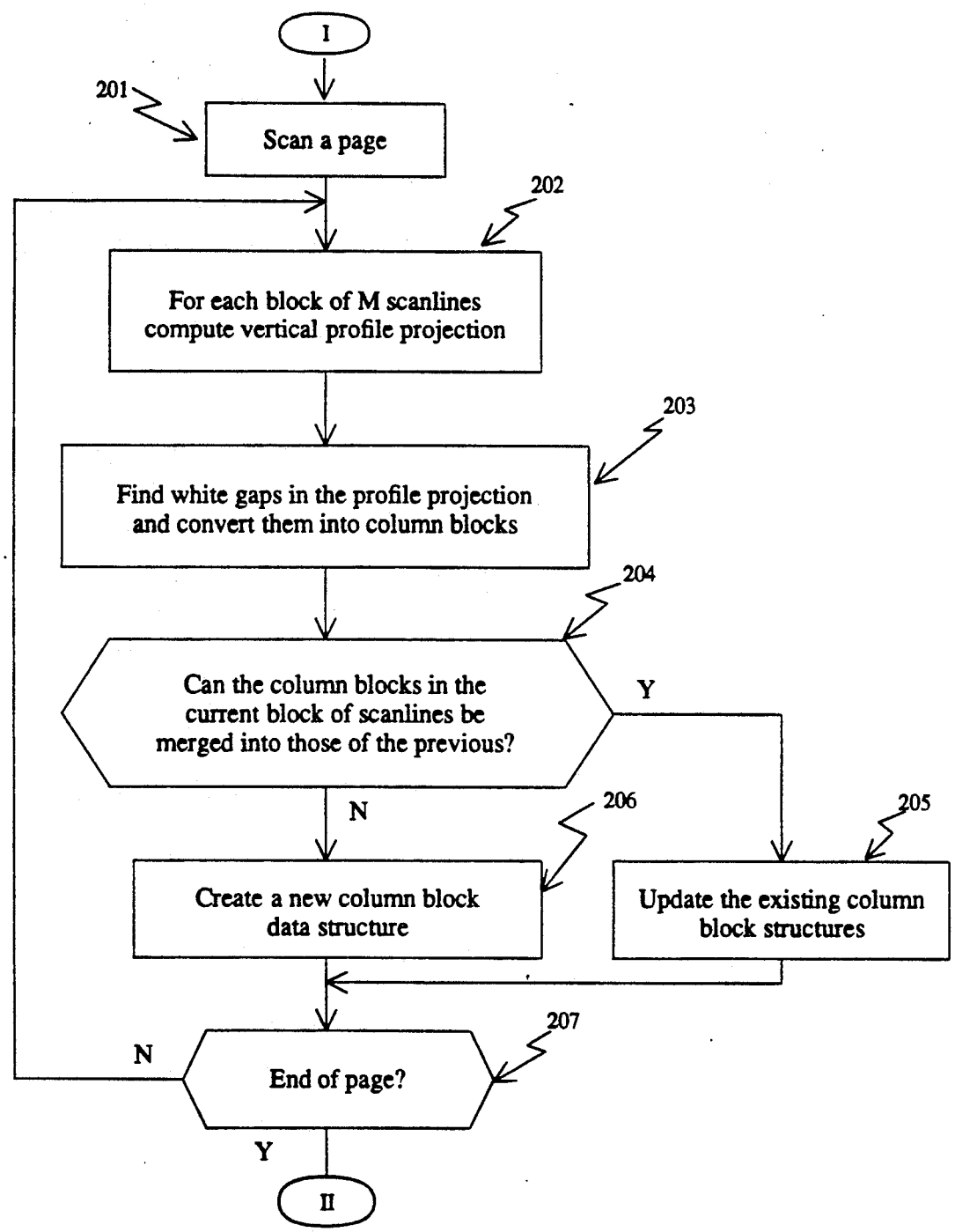
FIG. 2 illustrates the program flow steps for identifying column gaps and forming column blocks.

FIG. 2 illustrates the steps for identifying white spaces in the column gaps and the forming of the column blocks with common areas of column gaps. In step 201, the page is scanned and preprocessing of the data is performed.

In step 202, the scanned page is partitioned into blocks of scanlines for projection profile processing. In the preferred embodiment according to the present invention, the number of scan lines per block varies from 48 (0.16 inches) to 256 (0.85 inches) with 128 (0.43 inches) being the value that gives the optimum result.

In step 203, vertical projections are formed and the column gaps are identified by the wide white spaces in them. For example, 40 continuous pixels of white spaces may be used as the criteria for a "wide" white space. Areas of wide white spaces are assumed to be column gaps.

A smearing process may be embedded in the vertical projection. Any short black run of consecutive 1's in a scan line is absorbed by its neighboring white runs, if both of its two neighboring white runs are not too short.

A black run is defined as short if it has a length less than a parameter (e.g. NOISE_B) selected equal to 5 in this embodiment. Similarly a white run is defined as not too short if it has a length shorter than a parameter (e.g. NOISE_W) selected equal to 10 in this embodiment. This processing eliminates the sporadic black noise spots occurring in the column gaps without wiping off black dot textures in illustration regions, which are often composed of short run black-white dot patterns.

When a column gap is encountered in a block, that block is set aside as part of a column block.

In steps 204 and 205, the column gap found in the next scanline block will be compared to the column gap of the column block previously identified. If appropriate, the new scanline block will be merged with the column block. If not, a new column block is formed (step 206). The conditions for merging are as follows:

Assuming each column gap is a rectangle specified by $X_{left}$, $X_{right}$, $Y_{top}$, and $Y_{bottom}$ in which $P \rightarrow X_{left}$ means the left endpoint of a column gap pointed by P. Any new found column gap pointed by P in the scanline block being processed will be merged into an existing column block Q if all of the following three conditions are satisfied:

1. The two gaps are very close in the vertical direction:

$$|P \rightarrow Y_{top} - Q \rightarrow Y_{bottom}| = \epsilon_1$$

a pre-specified tolerance $\epsilon_1$.

2. One of the horizontal projections of the two column gaps is completely inside the other:

$$P \rightarrow X_{left} > Q \rightarrow X_{left} - \epsilon_2 \text{ and}$$
$$P \rightarrow X_{right} < Q \rightarrow X_{right} - \epsilon_2$$

or $$P \rightarrow X_{left} < Q \rightarrow X_{left} - \epsilon_2 \text{ and}$$
$$P \rightarrow X_{right} > Q \rightarrow X_{right} - \epsilon_2$$

where $\epsilon_2$ is a second pre-defined tolerance.

3. The widths of the two column gaps are approximately the same:

$$\frac{\min\{P \rightarrow X_{right} - P \rightarrow X_{left}, Q \rightarrow X_{right} - Q \rightarrow X_{left}\}}{\max\{P \rightarrow X_{right} - P \rightarrow X_{left}, Q \rightarrow X_{right} - Q \rightarrow X_{left}\}} < \epsilon_3$$

where $\epsilon_2$ is a third pre-defined tolerance.

In the preferred embodiment, $\epsilon_1$ is two pixels, $\epsilon_2$ is 2 and $\epsilon_3$ is 0.98.

The left and right margins of the page will also have wide white spacings and will therefore be considered as column gaps. They are processed the same way as for other column gaps but will be identified as margins in subsequent processing.

Figure 3:
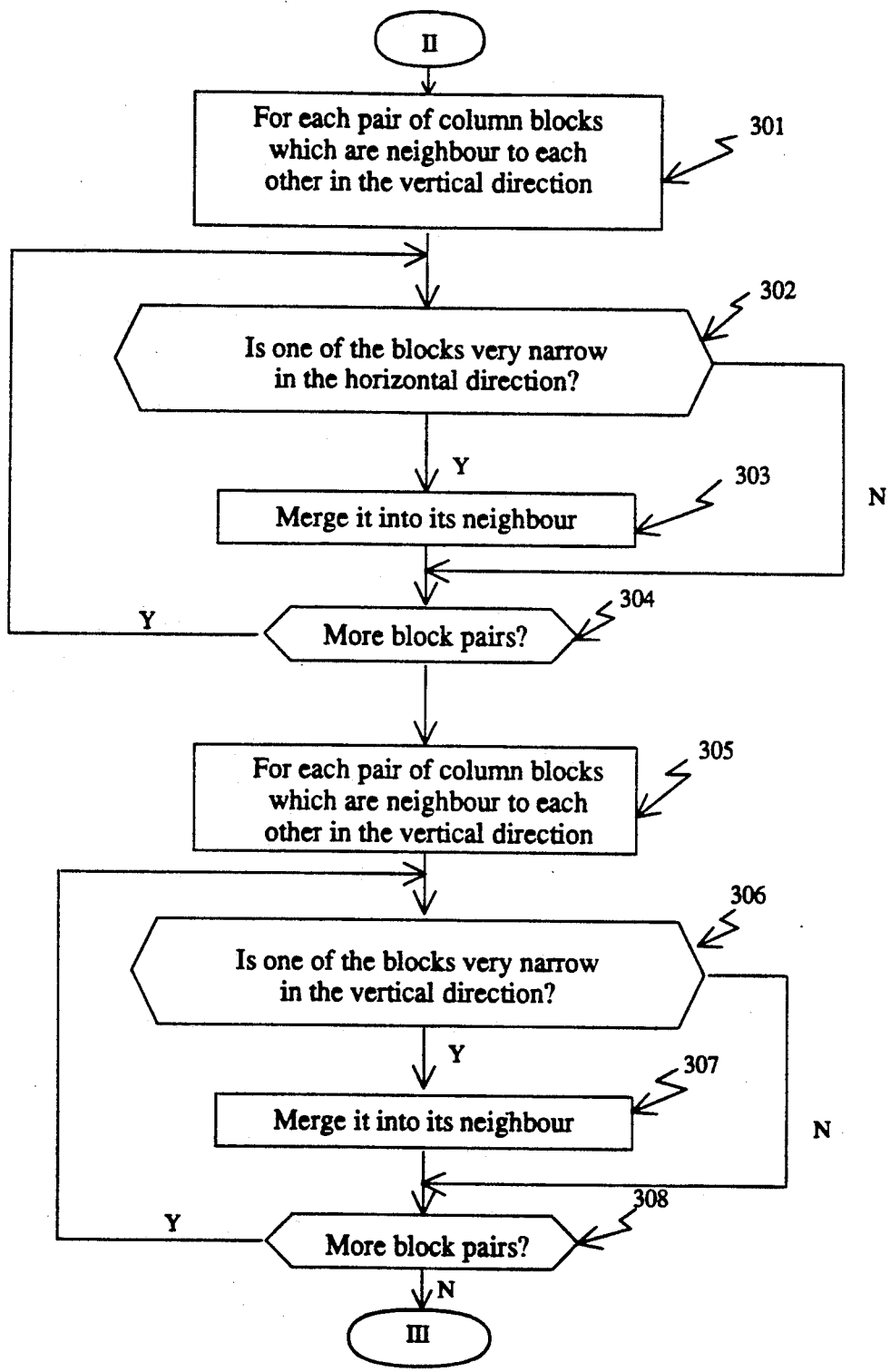
FIG. 3 illustrates the program flow steps for the treatment of wide white spacings resulting from other than column gaps.

FIG. 3 shows the flow steps for handling wide white spacings resulting from other than column gaps, for example, the line ending a paragraph with a small amount of text and a wide white spacing. This process is shown in steps 301 to 308 and involves the re-examination of the blocks that are small either in the vertical or horizontal direction, and in addition satisfy conditions 1 and 2 of the merger test described in step 204. Larger tolerances $\epsilon_1$ and $\epsilon_2$ are used in this process. In the preferred embodiment, $\epsilon_1$ is 20 and $\epsilon_2$ is 5.

In step 301, two column blocks which are neighbor to each other in the vertical direction are examined. Tests for horizontal merger are performed in step 302. If the ratio computed between the smaller width over the larger width is less than 0.2, then the smaller block is a merger candidate. In step 303, if the candidate satisfies conditions 1 and 2 of the merger test in step 204, the blocks are merged. The same tests are performed for the remaining blocks in step 304.

In step 305, the neighboring column blocks are examined and a vertical merger test is performed in step 306. If the ratio between the block having a smaller height over the block having a taller height is less than 0.4, then the shorter block is a merger candidate. In step 307, conditions 1 and 2 of step 204 are tested on the identified candidate and the respective blocks are merged if the conditions are satisfied. The same tests are performed for the remaining blocks in step 308.

Figure 5:
FIG. 5 illustrates a sample scanned page.
Figure 5:
Figure 5:
Figure 5:
Figure 6:
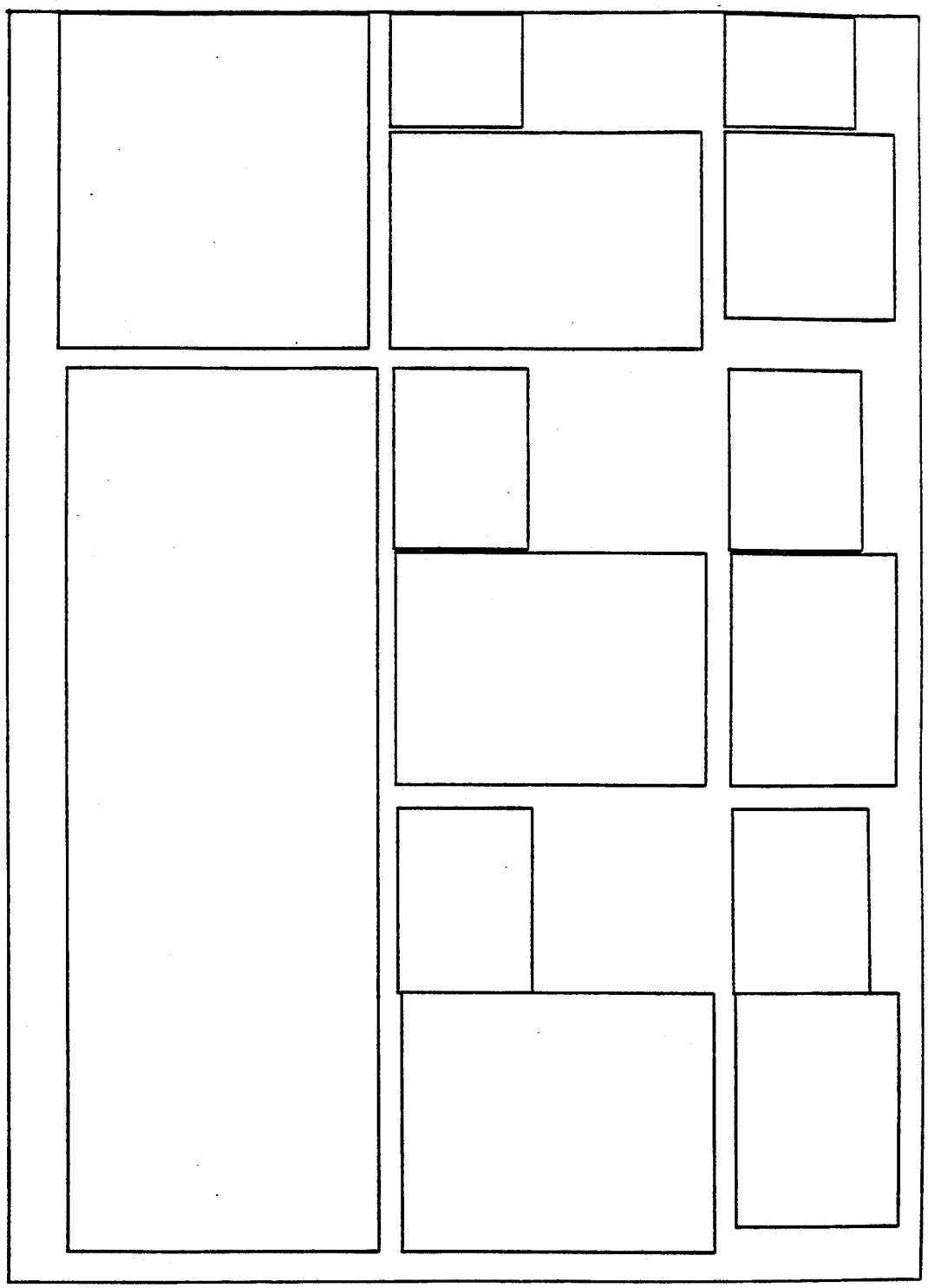
FIG. 6 illustrates the result of the recognition process according to the present invention.

FIG. 5 shows a scanned page and FIG. 6 the recognized result of the scan and the processing according to the technique described above. This result appears satisfactory. However, when the scanned page is tilted, the recognized result will also be tilted. Thus, additional processing is needed. Since one does not know in advance whether there will be a skew in the page under scan, the skew estimation process should be incorporated in all scans.

Figure 4:
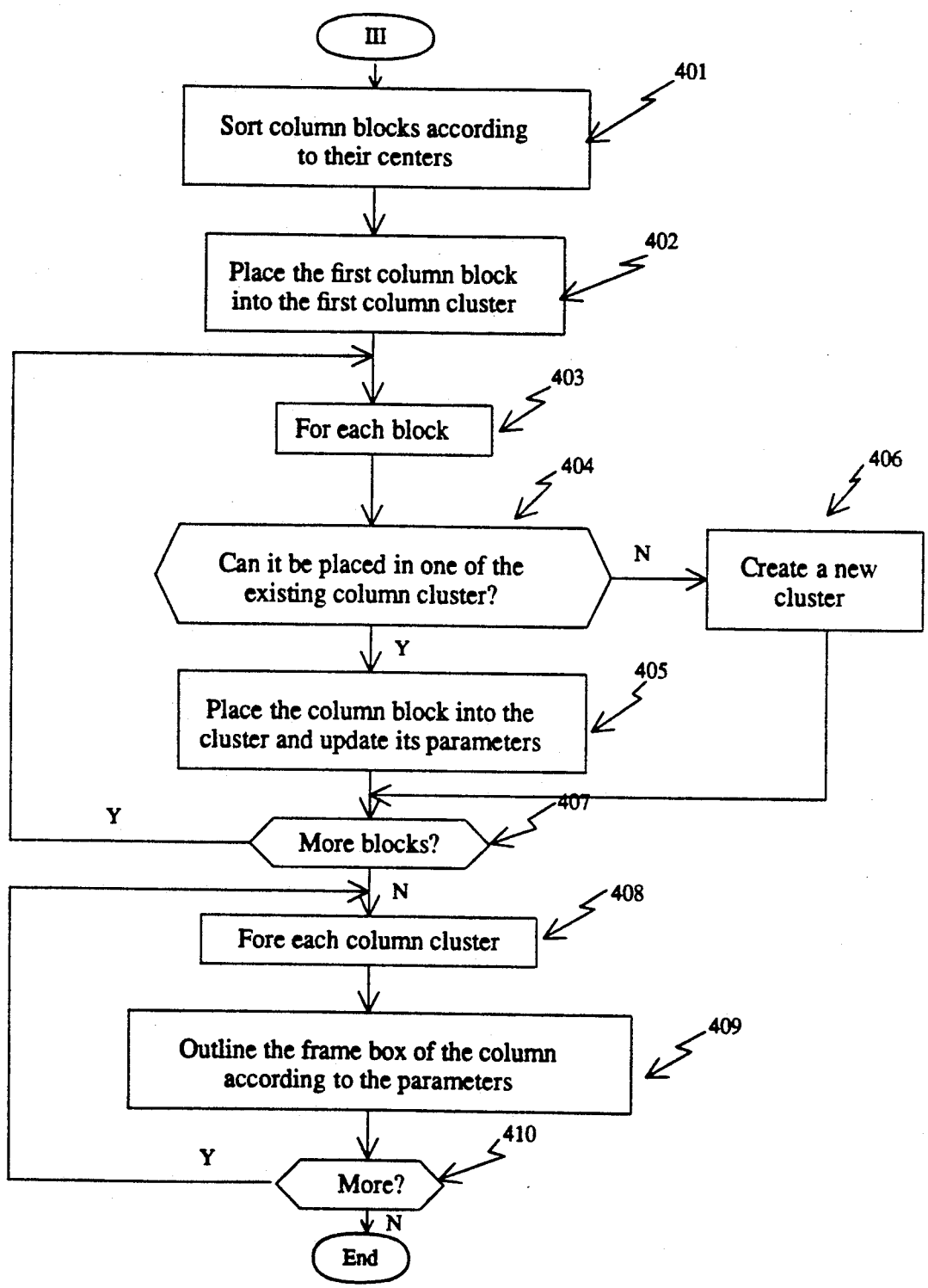
FIG. 4 illustrates the program flow steps for merging column blocks.

According to the skew estimation technique of the present invention, straight lines represented by $y = ax + b$ are placed into the column gaps in the column block using a linear algorithm. (See, for example, the text by T. Pavlidis *Structural Pattern Recognition*, Chapter 7, Springer Verlag (1977)). As shown in steps 401 to 410 of FIG. 4, blocks are merged if their lines are approximately collinear and their widths are approximately the same. When no further merging is possible the slope of the line provides an estimate of the skew angle.

A column block is represented by $Y_{top}$, $Y_{bottom}$, width, and a straight line through the middle of the block, $y = ax + b$. A non-labeled column block is a column block to be merged to a column block set. A non-labeled column block is represented as previously indicated for column gaps.

P is a pointer of a column block set, and Q is a pointer of a non-labeled column block. Q will be merged into P if the following three conditions are satisfied:

1. P and Q are very close in the vertical direction:

$|P \rightarrow Y_{top} - Q \rightarrow Y_{bottom}| < \epsilon_1$ or
$|P \rightarrow Y_{bottom} - Q \rightarrow Y_{top}| < \epsilon_1$ for a pre-specified tolerance $\epsilon_1$.

2. The center point of column block Q is not far away from the central Y axis of P:

$\{((Q \rightarrow Y_{top} + Q \rightarrow Y_{bottom})/2) - b\}/a - ((Q \rightarrow X_{left} + Q \rightarrow X_{right})/2) < \epsilon_4$ where $\epsilon_4$ is a pre-defined tolerance, "a" is the slope of the line and "b" is the y axis adjustment value.

3. The widths of P and Q are approximately the same:

$$\frac{\min |P \rightarrow \text{width}, Q \rightarrow X_{right} - Q \rightarrow X_{left}|}{\max |P \rightarrow \text{width}, Q \rightarrow X_{right} - Q \rightarrow X_{left}|} < \epsilon_3$$

where $\epsilon_3$ is a pre-defined tolerance.

In the preferred embodiment, $\epsilon_1$ is set to 40, $\epsilon_3$ is set to 0.9 and $\epsilon_4$ is set to 40.

In contrast to other prior approaches, the skew estimation according to the present invention does not require a large computing overhead. This is because only the partitioned blocks are processed as opposed to all the texts and images in a whole page. A much smaller memory is required because of the smaller processing requirement.

Because of noise, the estimated angles are not all the same and a weighted average is computed by using the length of the blocks to weigh the angles of the corresponding angles. If the average estimated skew angle is less than a predefined value, then the input page is considered to be roughly upright, and no correction is applied. Otherwise, the left and right lines of each column blocks are rotated according to the average skew angle. If desirable, column blocks could also be outlined according to their individual skew angles.

For the same reasons that a second pass is made during the initial column block formation process, a second pass is made to further merge blocks if two compared blocks have similar skew angles, touch each other in the vertical direction, have similar width, and the last interval of one overlaps significantly the first interval of the other.

Although an exemplary embodiment of the invention in its various aspects has been described above and shown in the accompanying drawings, flow charts and software listing, the invention is not limited to the particular aspects of the example but should be interpreted in accordance with the claims which follow.

```
/*      column classification    */
#include "col.def"
#include <stdio.h>
long int area();
scanline lines[BKS];
FILE *fd;
short yskip=0, yend=4000;     /* 10 in */
short UNIFORM=1;

mesg(serious,s,a1,a2,a3,a4,a5)
char *s;
{
     fprintf(stderr,s,a1,a2,a3,a4,a5);
     if(serious) exit(1);
}

/*    Maximum number fo scanlines per block   (abt 0.5inch)   */ int get_sline(place)
     short *place;
{
     short n;
```

```
        if(fread(&n,sizeof(short),1,fd)<1) return(0);
        fread(place,sizeof(short),n,fd);
        return(n);
} int his[2512];
Col_pos col_pos;
Pos pos[BKS];
Col_box col_box;
Col_block col_block;
short pro[2512];
Line *ColStart=NULL, *ColEnd=NULL;

/*---------------------------------
 * compute profile projection over
 * a scanline block
 *---------------------------------*/ column_count(lines,nline)
scanline *lines;
int nline;
{
        scanline *p;
        short xend, intv, n;
        register i, j, k;

for(i=0; i<LENGTH; i++) { his[i] = 0; pro[i] = 0;}
        for(j=0; j<nline; j++) {
                p = lines+j; xend = 0;
                for( i=0; i<p->n; i++) {
                        intv = *(p->x+i);
                        if(i%2) {
                                if(intv > NOISE_B)
                                   for(k=xend; k<xend+intv; k++) pro[k]++;
                                else {
                                        if(*(p->x+i-1)<=NOISE_W ||
                                           *(p->x+i+1)<=NOISE_W )
                                        for(k=xend; k<xend+intv; k++)
                                        pro[k]++;
                                }
                        }
                        xend += intv;
                }
        }
}

/*---------------------------------
 * Pick up wide white spaces in the profile
 * of a scaline block, and construct from
 * them column gaps.
 *---------------------------------*/ column_check()
{
        register i, j, k;
        int set, intv, end;
        int left, right;

i = 0; col_pos.n = 0;
        end = 2512;
        left = 0; set = 1;
        while (i<end) {
                right = i;
                if(pro[i] == 0) {
                        j=i; intv = 1;
```

```
                while(++j<end && (pro[j] ==0)) { intv++; }
                if(intv > MIN_COL_ITVL ) {
                set = 1 - set;
                if((right - left) > MIN_TXT_LEN) {
                        k = col_pos.n++;
                        if(k>=MXC) mesg(1," col_pos OVFL\n");
                        col_pos.left[k] = left;
                        col_pos.right[k] = right;
#ifdef DEBUG
                        mesg(0," column at location %d\n",i+intv/2);
                        mesg(0,"right = %d,left = %d\n",left,right);
#endif
                }
                left = j - 1; set = 1 - set;
                }
                i = (++j);
            }
            else i++;
        }
        if(set && ((right - left) > MIN_TXT_LEN)) {
                k = col_pos.n++;
                if(k>=MXC) mesg(1," col_pos OVFL\n");
                col_pos.left[k] = left;
                col_pos.right[k] = right;
#ifdef DEBUG
                mesg(0," column at location %d\n",i+intv/2);
                mesg(0,"right = %d, left = %d\n",left,right);
#endif
        }

}

/*-------------------------------------
 * check if the line segment (x1,x2)
 * and the line segment (col_x1,col_x2)
 * overlap with each other
 *------------------------------------*/ overlape(x1,x2,col_x1,col_x2)
short x1, x2, col_x1, col_x2;
{
        if(x2<col_x1 || x1>col_x2) return(0);

return(1);
} co_center(c1,c2,ECT)
short c1, c2;
int ECT;
{ if(abs(c1-c2) <ECT) return(1);
        return(0);
}

/*-------------------------------------
 * check if one line segment contains
 * another
 *------------------------------------*/ contain(x1,x2,c_x1,c_x2, BIAS)
short x1, x2, c_x1, c_x2, BIAS;
{ if((x1 > c_x1 - BIAS) && (x2 < c_x2 + BIAS)) return(1);
        if((c_x1 > x1 - BIAS) && (c_x2 < x2 + BIAS)) return(1);
        return(0);
```

}

```
adjacent(y1,y2,BIAS)
short y1,y2;
short BIAS;
{
        if(abs(y1-y2)<BIAS) return(1);
        return(0);
}

/*----------------------------------
 * update the column box set by merging
 * a new found box into the old one
 *----------------------------------*/ update_col(x1,x2,y1,y2,n_col)
short x1, x2, y1, y2;
int n_col;
{
        Col_box *p;
        Box *bp;
        short x;

p = &col_box; bp = p->box+n_col;
        x = bp->x_left;
        bp->x_left = (x1<x) ? x1:x;
        x = bp->x_right;
        bp->x_right = (x2>x) ? x2:x;
        bp->y_down = y2;
} add_new_col(x1,x2,y1,y2)
short x1, x2, y1, y2;
{
        Col_box *p;
        int i;

p = &col_box;
        i = p->n++; if(i>=MXC) mesg(1," col_box OVFL\n");
        p->box[i].x_left = x1;
        p->box[i].x_right = x2;
        p->box[i].y_up = y1;
        p->box[i].y_down = y2;
} column_update(y,nline)
int y, nline;
{
        Col_box *p;
        Col_pos *q;
        Box *bp;
        register i, j;
        short x1, x2, c_x1, c_x2, DONE, s1,s2;

p = &col_box; q = &col_pos;
        if(q->n == 0) return;
        for(i=0; i<q->n; i++) {
                DONE = 0; x1 = q->left[i]; x2 = q->right[i];
                s1 = x2 - x1;
                for(j=0; j<p->n; j++) {
                        bp = p->box+j;
                        c_x1 = bp->x_left;
                        c_x2 = bp->x_right;
                        s2 = c_x2 - c_x1;
/*
```

```
                merge happens if two column blocks adjacent and size compatable
                This part is subject to adjustment.
*/
                        if(adjacent(y-nline,bp->y_down,2) &&
                            contain(x1,x2,c_x1,c_x2,2) &&
                            size_comp(s1,s2,0.98)) {
                                update_col(x1,x2,y-nline,y,j);
                                DONE = 1; break;
                        }
                }
                if(DONE == 0 ) add_new_col(x1,x2,y-nline,y);
        }
}

/*-------------------------------------
* This routine checks if the new
* column block "Bp" aligns in column
* direction with block "Lp"
*-----------------------------------*/ check_alignment(Bp,Lp)
Block *Lp;
Box *Bp;
{
        short y11, y12, y21, y22;
        double fy;
        short cx, cy, y;

y11 = Lp->x_B;
        y12 = Bp->y_up;
        y21 = Lp->x_T;
        y22 = Bp->y_down;
        cx = (Bp->y_up + Bp->y_down)/2;
        cy = (Bp->x_right + Bp->x_left)/2;
/*
        The parameters are subject to adjustment.
*/
        if(adjacent(y11,y12,40) || adjacent(y21,y22,40)) {
                fy = Lp->a*cx + Lp->b;
                y = fy;
                if(abs(y-cy)<ALIGN_BIAS) return(1);
                else return(0);
        }
        return(0);
}

/*-------------------------------------
* Merge a new column block into
* block "Lp"
*-----------------------------------*/

ModifyBlock(Bp,Lp)
Box *Bp;
Block *Lp;
{
        double D;
        short n;
        double BIAS = 5;
        short cx, cy, s;

cy = (Bp->x_right + Bp->x_left)/2;
        cx = (Bp->y_down + Bp->y_up)/2;

n = Lp->n++;
        Lp->x_av = (n * Lp->x_av + cx)/(n + 1);
        Lp->y_av = (n * Lp->y_av + cy)/(n + 1);
```

```
        Lp->x_2_av = (n * Lp->x_2_av + cx*cx)/(n + 1);
        Lp->xy_av = (n * Lp->xy_av + cx*cy)/(n + 1);

D = Lp->x_2_av - Lp->x_av * Lp->x_av ;
        Lp->a = (Lp->xy_av - Lp->x_av * Lp->y_av)/D;
        Lp->b = Lp->y_av - Lp->a * Lp->x_av;

s = Bp->x_right - Bp->x_left;
        Lp->wdt = (n*Lp->wdt + s)/(n+1);
        Lp->x_T = (Lp->x_T<Bp->y_up) ? Lp->x_T : Bp->y_up;
        Lp->x_B = (Lp->x_B>Bp->y_down) ? Lp->x_B : Bp->y_down;
        if(Lp->minL>Bp->x_left) {
                Lp->T_L = Bp->y_up;
                Lp->B_L = Bp->y_down;
                Lp->minL = Bp->x_left;
        }
        if(Lp->maxR<Bp->x_right) {
                Lp->T_R = Bp->y_up;
                Lp->B_R = Bp->y_down;
                Lp->maxR = Bp->x_right;
        }

/*      Lp->minL = (Lp->minL<Bp->x_left) ? Lp->minL : Bp->x_left;
        Lp->maxL = (Lp->maxL>Bp->x_left) ? Lp->maxL : Bp->x_left;
        Lp->minR = (Lp->minR<Bp->x_right) ? Lp->minR : Bp->x_right;
        Lp->maxR = (Lp->maxR>Bp->x_right) ? Lp->maxR : Bp->x_right;
        Lp->avL = (n*Lp->avL + Bp->x_left)/(n+1);
        Lp->avR = (n*Lp->avR + Bp->x_right)/(n+1);*/
} size_comp(s1,s2, bias)
short s1,s2;
double bias;
{
        double r;

r = (s1<s2) ? (double)s1/s2 : (double)s2/s1;
        if(r>bias) return(1);
        return(0);
}
BlockClustering(Bp)
Box *Bp;
{
        Col_block *lp;
        Block *Lp;
        int DONE=0;
        short s1, s2;
        register j;

DONE = 0;
        lp = &col_block;
        s1 = Bp->x_right - Bp->x_left;
        for(Lp=lp->block,j=0; j<lp->n; Lp++,j++) {
                s2 = Lp->wdt;
/*
        The parameters are subject to adjustment.
*/
                if(size_comp(s1,s2, 0.9) &&
                        check_alignment(Bp,Lp)== 1) {
                        ModifyBlock(Bp,Lp);
                        DONE = 1; break;
                }
        }
        return(DONE);
}

NewBlock(Bp)
```

```
Box *Bp;
{
        short n;
        Block *Lp;
        short cx, cy;

n = col_block.n++;
        cx = (Bp->y_up + Bp->y_down)/2;
        cy = (Bp->x_left + Bp->x_right)/2;
        Lp = &(col_block.block[n]);
        Lp->x_T = Bp->y_up; Lp->x_B = Bp->y_down;
        Lp->T_L = Bp->y_up; Lp->B_L = Bp->y_down;
        Lp->T_R = Bp->y_up; Lp->B_R = Bp->y_down;
        Lp->x_av = cx; Lp->y_av = cy;
        Lp->xy_av = cx*cy;
        Lp->x_2_av = cx*cx;
        Lp->n = 1;
        Lp->a = 0.;
        Lp->b = cy;
        Lp->wdt = Bp->x_right - Bp->x_left;
        Lp->minL = Lp->maxL = Lp->avL = Bp->x_left;
        Lp->minR = Lp->maxR = Lp->avR = Bp->x_right;
}

OutlineColumn()
{
        register i;
        Col_box *bp;
        Box *Bp;
        int n, DONE;

bp = &col_box;
        if(bp->n == 0) return;
        BoxSort();
        for(Bp=bp->box,i=0; i<bp->n; Bp++,i++) {
                if(Bp->unused) continue;
                DONE = BlockClustering(Bp);
                if(DONE==0) NewBlock(Bp);
        }

}

/*----------------------------------
* output intermediate column interval
* box
*----------------------------------*/ output_col_box()
{
        short i;
        Col_box *p;
        short x,y;

p = &col_box;
        for(i=0; i<col_box.n; i++) {
                if(p->box[i].unused) continue;
                write(1, &i,2);
                x = p->box[i].x_left; write(1,&x,2);
                x = p->box[i].x_right; write(1,&x,2);
                y = p->box[i].y_up; write(1,&y,2);
                y = p->box[i].y_down; write(1,&y,2);
        }
}

OutputColumn()
{
```

```
        register i;
        Block *Lp;
        double a, Vote();

BMergeProc(0.09);
        a = Vote();
        Lp = col_block.block;
        for(i=0; i<col_block.n; Lp++,i++) {
                write_block(Lp,a);
        }
}

/*----------------------------------------
 * Tilt check : if the average tilt
 * angle over all column clusters is
 * larger than a threshold "MIN_TILT"
 * then the page is assumed tilted, with
 * tilt angle equal to the largest of the
 * cluster angers, otherwise the tilt
 * angle is set to be zero.
 *----------------------------------------*/ double Vote()
{
        register i;
        Block *Lp;
        double av_a, av_A, max_a, bias=0.0001;
        short av_n, av_N, max_n;

av_a = av_A = 0.;
        av_n = av_N = 0;
        max_a = 0.; max_n = 0;
        Lp = col_block.block;
        for(i=0; i<col_block.n; Lp++,i++) {
                av_a += Lp->n*Lp->a;
                av_n += Lp->n;
                max_a = fabs(max_n*max_a)>fabs(Lp->n*Lp->a) ? max_a : Lp->a;
                max_n = fabs(max_n*max_a)>fabs(Lp->n*Lp->a) ? max_n : Lp->n;
                if(fabs(Lp->a)>bias) {
/* average of tilt angle larger than than bias */
                        av_A += Lp->a*Lp->n;
                        av_N += Lp->n;
                }
        }
        if(fabs(av_a/av_n)>MIN_TILT) return(av_a/av_n);
        else return(0.);
}

/*----------------------------------------
 * This routine computes the four corner
 * locations of a tilted column block by
 * the tilt angle and outlines the column
 * block
 *----------------------------------------*/ write_block(Lp,a)
Block *Lp;
double a;
{
        short x11, x12, x21, x22;
        short y11, y12, y21, y22;
        double aa, bb, eps=0.0001, b1, b2;
        short cx;

cx = (Lp->x_B + Lp->x_T)/2;
        if(!UNIFORM) a = Lp->a;
```

```
            if(fabs(a)<eps) {
                b1 = Lp->avL;
                x11 = Lp->x_T; y11 = x11*a + b1;
                x12 = Lp->x_B; y12 = x12*a + b1;
                b2 = Lp->avR;
                x21 = Lp->x_T; y21 = x21*a + b2;
                x22 = Lp->x_B; y22 = x22*a + b2;
            }
            else {
                aa = (-1/a);
                if(aa>0) {
                    b2 = Lp->minL - a*Lp->T_L;
                    b1 = Lp->maxR - a*Lp->B_R;
                }
                else {
                    b2 = Lp->maxR - a*Lp->T_R;
                    b1 = Lp->minL - a*Lp->B_L;
                }
                bb = (a - aa)*Lp->x_T + b2;
                x11 = (bb - b1)/(a - aa);
/*              x11 = Lp->x_T;*/
                y11 = x11*a + b1;
/*              x12 = Lp->x_B;*/
                bb = (a - aa)*Lp->x_B + b2;
                x12 = (bb - b1)/(a - aa);
                y12 = x12*a + b1;

/*              bb = (a - aa)*Lp->x_T + b1;
                x21 = (bb - b2)/(a - aa);*/
                x21 = Lp->x_T;
                y21 = a*x21 + b2;
/*              bb = (a - aa)*Lp->x_B + b1;
                x22 = (bb - b2)/(a - aa);*/
                x22 = Lp->x_B;
                y22 = a*x22 + b2;

if(x11 <=1) x21 = x11;
                if(y11 >=2500) y12=y11;
            } write(1,&x11,2); write(1,&y11,2);
        write(1,&x12,2); write(1,&y12,2);
        write(1,&x21,2); write(1,&y21,2);
        write(1,&x22,2); write(1,&y22,2);
} static compar(b1,b2)
Box *b1, *b2;
{
        double y1, y2;

y1 = b1->y_up;
        y2 = b2->y_up;
        if(y1<y2) return(-1);
        if(y1>y2) return(1);
        return(0);
}

/*----------------------------------------------
* Sort column interval boxes in increasing
* order by their locations in the column
* direction
*----------------------------------------------*/

BoxSort()
{
```

```
        Col_box *p;

p = &col_box;
        qsort((char *)p->box, p->n,sizeof(p->box[0]),compar);
}

/*----------------------------------
 * This routine merges a very short
 * column block into its adjacent
 * neighbour
 *----------------------------------*/ slim_col_merge()
{
        register i, j;
        Col_box *bp;
        Box *b1, *b2;
        short stats;
        short change;
        int a1, a2;
        double r;

bp = &col_box;
        if(bp->n == 0) return;
        change = 1;
        while(change) {
                change = 0;
                for(i=0, b1=bp->box;i<bp->n;i++,b1++) {
                if(b1->unused) continue;
                for(j=0, b2= bp->box; j<bp->n; j++, b2++) {
                        if(b2->unused || i==j) continue;
/* delete blocks which are inside in others     */
                        switch(stats = inside(b1,b2)) {
                                case 1: b1->unused = 1;
                                        break;
                                case 2: copy(b1,b2);
                                        b1->unused = 1;
                                        break;
                                default: break;
                        }
                        if(stats != 0) break;
                        if((stats = attached(b1,b2))==0) continue;
                        a1 = slim(b1); a2 = slim(b2);
                        r = a1 > a2 ? (double)a2/a1 : (double)a1/a2;
/*
        The parameters are subject to adjustment.
*/
                        if(r<0.2) {
                                if(a2>a1) {
                                        b1->unused = 1;
                                        merge(b1,b2,stats); change = 1;
                                        break;
                                }
                                else {
                                        stats = -stats;
                                        merge(b2,b1,stats); change = 1;
                                        copy(b1,b2);
                                        b1->unused = 1;
                                        break;
                                }
                        }
                }
                }
        }
}
```

```
/*----------------------------------
 * This routine merges a very slim
 * column block into its adjacent
 * neighbour
 *----------------------------------*/ slice_col_merge()
{
        register i, j;
        Col_box *bp;
        Box *b1, *b2;
        short stats;
        short change;
        int a1, a2, c1, c2;
        double r;

bp = &col_box;
        if(bp->n == 0) return;
        change = 1;
        while(change) {
                change = 0;
                for(i=0, b1=bp->box;i<bp->n;i++,b1++) {
                if(b1->unused) continue;
                for(j=0, b2= bp->box; j<bp->n; j++, b2++) {
                        if(b2->unused || i==j) continue;
/* delete blocks which are inside in others    */
                        switch(stats = inside(b1,b2)) {
                                case 1: b1->unused = 1;
                                        break;
                                case 2: copy(b1,b2);
                                        b1->unused = 1;
                                        break;
                                case 0: break;
                        }
                        if(stats != 0) break;
                        if((stats = attached(b1,b2))==0) continue;
                        a1 = slice(b1); a2 = slice(b2);
                        c1 = slim(b1); c2 = slim(b2);
                        r = a1 > a2 ? (double)a2/a1 : (double)a1/a2;
/*
        The parameters are subject to adjustment.
*/
                        if(r<0.4) {
                                if(c1<c2) {
                                        b1->unused = 1;
                                        merge(b1,b2,stats); change = 1;
                                        break;
                                }
                                else {
                                        stats = -stats;
                                        merge(b2,b1,stats); change = 1;
                                        copy(b1,b2);
                                        b1->unused = 1;
                                        break;
                                }
                        }
                }
                }
        }

} inside(b1,b2)
Box *b1, *b2;
{
        short x11, x12, y11, y12, x21, x22, y21, y22;
```

```
/*
        The parameters are subject to adjustment.
*/
        short BIAS=30;

x11 = b1->x_left; x12 = b1->x_right;
        y11 = b1->y_up;   y12 = b1->y_down;
        x21 = b2->x_left; x22 = b2->x_right;
        y21 = b2->y_up;   y22 = b2->y_down;
        if(x11>x21-BIAS && x12<x22+BIAS &&
            y11>y21-BIAS && y12<y22+BIAS) return(1);
        if(x11<x21+BIAS && x12>x22-BIAS &&
            y11<y21+BIAS && y12>y22-BIAS) return(2);
        return(0);
} slice(b)
Box *b;
{
        return((b->y_down - b->y_up));
} slim(b)
Box *b;
{
        return((b->x_right - b->x_left));
} long int area(b)
Box *b;
{
        return((b->y_down - b->y_up)*(b->x_right - b->x_left));
} merge(a1,a2,stats)
Box *a1, *a2;
short stats;
{
        int st;

st = stats + 3;
        switch(st) {
                case 4: a2->y_up =
                        a2->y_up>a1->y_up ? a1->y_up:a2->y_up;
                        break;
                case 2: a2->y_down =
                        a1->y_down>a2->y_down? a1->y_down: a2->y_down;
                        break;
                case 5: a2->x_left = a1->x_left;
                        break;
                case 1: a2->x_right = a1->x_right;
                        break;
                case 0: break;
        }
} attached(b1,b2)
Box *b1, *b2;
{
/*
        The parameters are subject to adjustment.
*/
        if(adjacent(b1->y_down, b2->y_up,20) &&
            contain(b1->x_left, b1->x_right, b2->x_left, b2->x_right,5))
        return(1);
        if(adjacent(b1->y_up, b2->y_down,20) &&
            contain(b1->x_left, b1->x_right, b2->x_left, b2->x_right,5))
```

```
                return(-1);
                return(0);
/*              if(adjacent(b1->x_right, b2->x_left,5) &&
                    contain(b1->y_up, b1->y_down, b2->y_up, b2->y_down,1))
                return(2);
                if(adjacent(b1->x_left, b2->x_right,5) &&
                    contain(b1->y_up, b1->y_down, b2->y_up, b2->y_down,1))
                return(-2);
*/
} col_merge()
{
        slice_col_merge();
        slim_col_merge();
/*      final_col_merge();*/

} copy(b1,b2)
Box *b1, *b2;
{
        b2->x_left = b1->x_left;
        b2->x_right = b1->x_right;
        b2->y_up = b1->y_up;
        b2->y_down = b1->y_down;
        b2->unused = b1->unused;
} final_col_merge()
{
        register i, j;
        Col_box *bp;
        Box *b1, *b2;
        short stats;
        short change;
        int a1, a2, c1, c2;
        double r;

bp = &col_box;
        if(bp->n == 0) return;
        change = 1;
        while(change) {
                change = 0;
                for(i=0, b1=bp->box;i<bp->n;i++,b1++) {
                if(b1->unused) continue;
                for(j=0, b2= bp->box; j<bp->n; j++, b2++) {
                        if(b2->unused || i==j) continue;
                        switch(stats = inside(b1,b2)) {
                                case 1: b1->unused = 1;
                                        break;
                                case 2: copy(b1,b2);
                                        b1->unused = 1;
                                        break;
                                case 0: break;
                        }
                        if(stats != 0) break;
                        if((stats = attached_2(b1,b2))==0) continue;
                        c1 = slim(b1); c2 = slim(b2);
                        r = c1 > c2 ? (double)c2/c1 : (double)c1/c2;
                        if(r>0.9) {
                                if(c2>c1) {
                                        b1->unused = 1;
                                        merge(b1,b2,stats); change = 1;
                                        break;
                                }
```

```
                    else {
                        stats = -stats;
                        merge(b2,b1,stats); change = 1;
                        copy(b1,b2);
                        b1->unused = 1;
                        break;
                    }
                }
            }
        }
    }
}

BMergeProc(BIAS)
double BIAS;
{
    Block *lp1, *lp2;
    register i, j;
    double s1, s2;
    short n;

n = col_block.n;
    for(i=0, lp1=col_block.block; i<n; lp1++,i++) {
        if(lp1->discard==1) continue;
        for(j=i+1, lp2=lp1+1; j<col_block.n; lp2++, j++) {
            if(lp2->discard==1) continue;
            s1 = lp1->wdt; s2 = lp2->wdt;
            if(size_comp(s1,s2,0.9) && BTouch(lp1, lp2) &&
                    (fabs(lp1->a - lp2->a)<BIAS)) {
                MergeBlock(lp1, lp2);
                col_block.n--;
            }
        }
    }
}

BTouch(lp1, lp2)
Block *lp1, *lp2;
{
    if(adjacent(lp1->x_T, lp2->x_B,40) || adjacent(lp1->x_B, lp2->x_T,40))
        return(1);
    else return(0);
}

MergeBlock(lp1, lp2)
Block *lp1, *lp2;
{
    lp1->a = (lp1->a + lp2->a)/2;
    lp1->b = (lp1->b + lp2->b)/2;
    lp1->wdt = (lp1->wdt + lp2->wdt)/2;
    lp1->x_T = lp1->x_T<lp2->x_T ? lp1->x_T : lp2->x_T;
    lp1->x_B = lp1->x_B>lp2->x_B ? lp1->x_B : lp2->x_B;
    if(lp1->minL > lp2->minL) {
        lp1->minL = lp2->minL;
        lp1->T_L = lp2->T_L;
        lp1->B_L = lp2->B_L;
    }
    if(lp1->maxR < lp2->maxR) {
        lp1->maxR = lp2->maxR;
        lp1->T_R = lp2->T_R;
        lp1->B_R = lp2->B_R;
    }
    lp1->avL = (lp1->n*lp1->avL + lp2->n*lp2->avL)/(lp1->n+lp2->n);
    lp1->avR = (lp1->n*lp1->avR + lp2->n*lp2->avR)/(lp1->n+lp2->n);
```

```
            lp1->n = lp1->n + lp2->n;
            lp2->discard = 1;
} attached_2(b1,b2)
Box *b1, *b2;
{
        if(adjacent(b1->y_down, b2->y_up,10) &&
            contain(b1->x_left, b1->x_right, b2->x_left, b2->x_right,40))
        return(1);
        if(adjacent(b1->y_up, b2->y_down,10) &&
           contain(b1->x_left, b1->x_right, b2->x_left, b2->x_right,40))
        return(-1);
        return(0);

} main(arc,arv)
      char **arv;
{
      int y, b;
      register i, j;
      int P_flag = 2;

while(arc>1 && arv[1][0]=='-'){
            switch(arv[1][1]){
            case 'b': P_flag = 0; break;
            case 'm': P_flag = 1; break;
            case 'c': P_flag = 2; break;
            case 'u': UNIFORM = 0;
            case 'y': yskip = atoi(arv[1]+2); break;
            case 'Y': yend  = atoi(arv[1]+2); break;
            default: mesg(0,"%s\n", "Usage: column [-bmc] f1");
            }
             arc--; arv++;
      }
      if(arc>1) {
            if((fd=fopen(arv[1],"r"))==NULL) {
                    mesg(0,"Cannot open %s\n",arv[1]);
                    exit(1);
            }
      }
      else fd = stdin;

y = 0; b = 0; j = 0;
      do {
              y++;
              if(y<yskip) continue;
              if((lines[j].n = get_sline(lines[j].x))<1) goto E_O_F;
              lines[j].n -= 5;        /* scanner peculiarity */
              if(lines[j].n <2 || j>BKS_2) {  /* blank or overflow */
                    if(j>1) {
#ifdef DEBUG
                            mesg(0,"\nBLOCK # %d",++b);
                            mesg(0," of %d lines ending at %d\n",
                                    j,y);
                            if(lines[j].n <2)   mesg(0,"Gap\n");
                            else mesg(0,"Sline OVFL\n");
#endif
                            column_count(lines,j);
                            column_check();
                            column_update(y,j);
```

```
                }
            j = 0;
        }
        else j++;
    } while (y<yend);
    E_O_F:  switch(P_flag) {
                    case 0:  output_col_box();
                             break;
                    case 1:  col_merge();
                             output_col_box();
                             break;
                    case 2:  col_merge();
                             OutlineColumn();
                             OutputColumn();
                             break;
                    default: col_merge();
                             OutlineColumn();
                             OutputColumn();
                             break;
            }
    mesg(0,"end of file\n");
}
```

We claim:

1. A method of scanning and reproducing a page having more than one column of text or pictorial images with a column gap having substantially equal white spacings in between said columns, comprising the steps of:

a. scanning said page and transforming the scanned images of the page into binary representations;

b. storing said binary representations in memory;

c. partitioning said binary representations into a plurality of scanline blocks, each block having a substantially equal number of scanlines arranged substantially in the same order in which they were scanned;

d. identifying the column gaps in each scanline block by obtaining a plurality of vertical projection profiles for each scanline block;

e. comparing the first scanline block with each of the subsequent scanline blocks and determining whether the identified column gaps in each block substantially match;

f. merging the scanline blocks into at least one column block where there are matches in column gaps;

g. estimating the skew angle in the merged column blocks by measuring the slope of the column gaps in the merged column blocks; and h. generating a reconstructed image from the scanned images according to the column blocks.

2. A method according to claim 1 wherein each of said plurality of scanline blocks is less than ⅛ of an inch in height.

3. A method according to claim 1 including the step of compensating for the skew by rotating the reconstructed image by the estimated skew angle.

4. An apparatus for scanning and reproducing a page having more than one column of text or pictorial images with a column gap having substantially equal white spacings in between said columns, comprising:

a. a scanner for scanning said page and transforming the scanned images of the page into binary representations;

b. a memory storing said binary representations;

c. means for partitioning said binary representations into a plurality of scanline blocks, each block having a substantially equal number of scanlines arranged substantially in the same order in which they were scanned;

d. means for identifying the column gaps in each scanline block by obtaining a plurality of vertical projection profiles for each scanline block;

e. means for comparing the first scanline block with each of the subsequent scanline blocks and determining whether the identified column gaps in each block substantially match;

f. means for merging the scanline blocks into at least one column block where there are matches in column gaps;

g. means for estimating the skew angle in the merged column blocks by measuring the slope of the column gaps in the merged column blocks; and h. means for generating a reconstructed image from the scanned images according to the column blocks.

5. An apparatus as in claim 4 wherein each of said plurality of scanline blocks is less than ⅛ of an inch in height.

6. An apparatus as in claim 4 including means for compensating for the skew by rotating the reconstructed image by the estimated skew angle.

7. A method of scanning and reproducing a page having more than one column of text or pictorial images with a column gap having substantially equal white spacings in between said columns, comprising the steps of:

a. scanning said page to generate an electronic image of said page, said electronic image having a binary representation for each pixel, each pixel representing a separate area of said page;

b. partitioning said electronic image into a plurality of scanline blocks, each scanline block including an array of the binary representations for a contiguous array of pixels;
d. identifying the column gaps in each scanline block by obtaining vertical projection profiles for a plurality of columns of said array for each scanline block;
e. comparing the first scanline block with each of the subsequent scanline blocks and determining whether the identified column gaps in each block substantially match;
f. merging the scanline blocks into at least one column block where there are matches in column gaps;
g. estimating the skew angle in the merged column blocks by measuring the slope of the column gaps in the merged column blocks; and
h. reconstructing said electronic image according to said column blocks.

* * * * *